United States Patent
Kim et al.

(10) Patent No.: US 12,063,979 B2
(45) Date of Patent: Aug. 20, 2024

(54) AEROSOL GENERATING DEVICE AND SYSTEM

(71) Applicant: KT&G CORPORATION, Daejeon (KR)

(72) Inventors: Yong Hwan Kim, Anyang-si (KR); Sung Wook Yoon, Suwon-si (KR); Seung Won Lee, Gwangmyeong-si (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 642 days.

(21) Appl. No.: 17/287,425

(22) PCT Filed: Dec. 15, 2020

(86) PCT No.: PCT/KR2020/018379
§ 371 (c)(1),
(2) Date: Apr. 21, 2021

(87) PCT Pub. No.: WO2021/157848
PCT Pub. Date: Aug. 12, 2021

(65) Prior Publication Data
US 2022/0395027 A1     Dec. 15, 2022

(30) Foreign Application Priority Data
Feb. 5, 2020    (KR) .................. 10-2020-0013739

(51) Int. Cl.
*A24F 40/53*     (2020.01)
*A24F 40/20*     (2020.01)
(Continued)

(52) U.S. Cl.
CPC .............. *A24F 40/53* (2020.01); *A24F 40/20* (2020.01); *A24F 40/465* (2020.01); *A24F 40/57* (2020.01); *G01V 3/10* (2013.01)

(58) Field of Classification Search
CPC ........ A24F 40/53; A24F 40/465; A24F 40/20; G01V 3/10
(Continued)

(56) References Cited

U.S. PATENT DOCUMENTS 5,902,501 A    5/1999   Nunnally et al.
6,053,176 A  *   4/2000   Adams .................... A24F 40/53
                                                                          131/329
(Continued)

FOREIGN PATENT DOCUMENTS

CN             109349690 A       2/2019
DE    10 2007 011 120 A1    9/2008
(Continued)

OTHER PUBLICATIONS

Office Action issued May 9, 2023 in Korean Application No. 10-2021-0153260.
(Continued)

*Primary Examiner* — Gary F Paumen
(74) *Attorney, Agent, or Firm* — Sughrue Mion, PLLC

(57) ABSTRACT

An aerosol generating device and system determine whether an aerosol generating substance is separated from the aerosol generating device based on an amount of change in inductance while power is blocked from being supplied to a heater.

15 Claims, 5 Drawing Sheets

(51) Int. Cl.
*A24F 40/465* (2020.01)
*A24F 40/57* (2020.01)
*G01V 3/10* (2006.01)

(58) Field of Classification Search
USPC .......................................................... 131/329
See application file for complete search history.

(56) References Cited

U.S. PATENT DOCUMENTS

| | | | | |
|---|---|---|---|---|
| 7,185,659 | B2* | 3/2007 | Sharpe | A24F 40/85 |
| | | | | 131/194 |
| 10,159,283 | B2* | 12/2018 | Mironov | A24F 40/46 |
| 10,194,696 | B2* | 2/2019 | Matischek | A24F 40/65 |
| 10,251,428 | B2 | 4/2019 | Lin et al. | |
| 10,375,994 | B2 | 8/2019 | Mironov et al. | |
| 10,842,198 | B2* | 11/2020 | Mironov | A24F 40/465 |
| 10,869,499 | B2 | 12/2020 | Fernando et al. | |
| 10,869,504 | B2* | 12/2020 | Mironov | A24F 40/465 |
| 10,939,703 | B2* | 3/2021 | Li | H05B 6/362 |
| 11,178,910 | B2 | 11/2021 | Kim et al. | |
| 2014/0299137 | A1* | 10/2014 | Kieckbusch | A24F 40/51 |
| | | | | 131/328 |
| 2014/0299141 | A1 | 10/2014 | Flick | |
| 2016/0150825 | A1 | 6/2016 | Mironov et al. | |
| 2016/0302488 | A1 | 10/2016 | Fernando et al. | |
| 2017/0086508 | A1* | 3/2017 | Mironov | A24D 1/20 |
| 2017/0095003 | A1 | 4/2017 | Mironov | |
| 2020/0221782 | A1 | 7/2020 | Lim | |
| 2022/0125125 | A1 | 4/2022 | Sayed et al. | |

FOREIGN PATENT DOCUMENTS

| | | |
|---|---|---|
| EP | 3 785 554 A1 | 3/2021 |
| GB | 201903248 | 4/2019 |
| GB | 201913479 | 10/2019 |
| JP | 2019-105 A | 1/2019 |
| KR | 10-0579783 B1 | 5/2006 |
| KR | 10-2017-0008209 A | 1/2017 |
| KR | 10-2017-0008730 A | 1/2017 |
| KR | 10-1776966 B1 | 9/2017 |
| KR | 10-2018-0124740 A | 11/2018 |
| KR | 10-2052716 B1 | 12/2019 |
| WO | 2019/129844 A1 | 7/2019 |
| WO | 2019/197170 A1 | 10/2019 |
| WO | 2019/206334 A1 | 10/2019 |
| WO | 2019/208974 A1 | 10/2019 |
| WO | 2021/053184 A1 | 3/2021 |

OTHER PUBLICATIONS

Office Action issued Mar. 27, 2023 in Chinese Application No. 202080006637.5.
Office Action dated Jun. 28, 2022, issued in Japanese Application No. 2021-535130.
International Search Report of PCT/KR2020/018379 dated Mar. 18, 2021 [PCT/ISA/210].
Written Opinion of PCT/KR2020/018379 dated Mar. 18, 2021 [PCT/ISA/237].

* cited by examiner

【Figure 1】
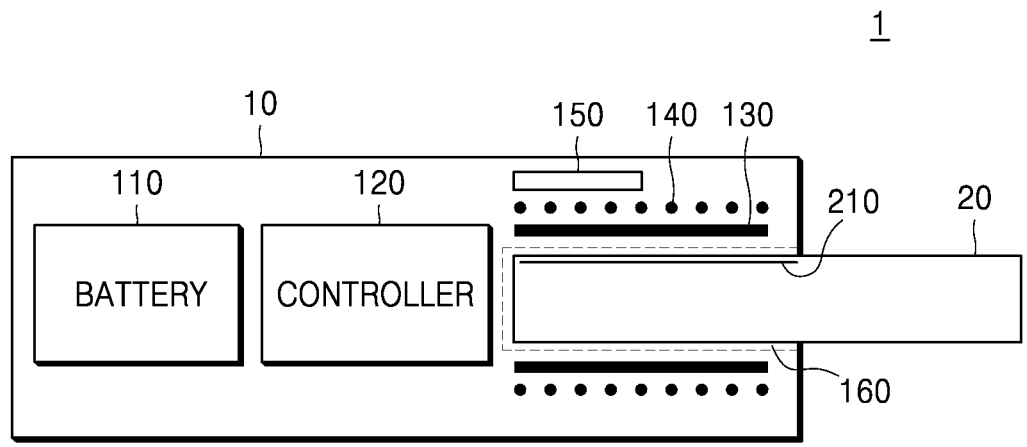
【Figure 2】
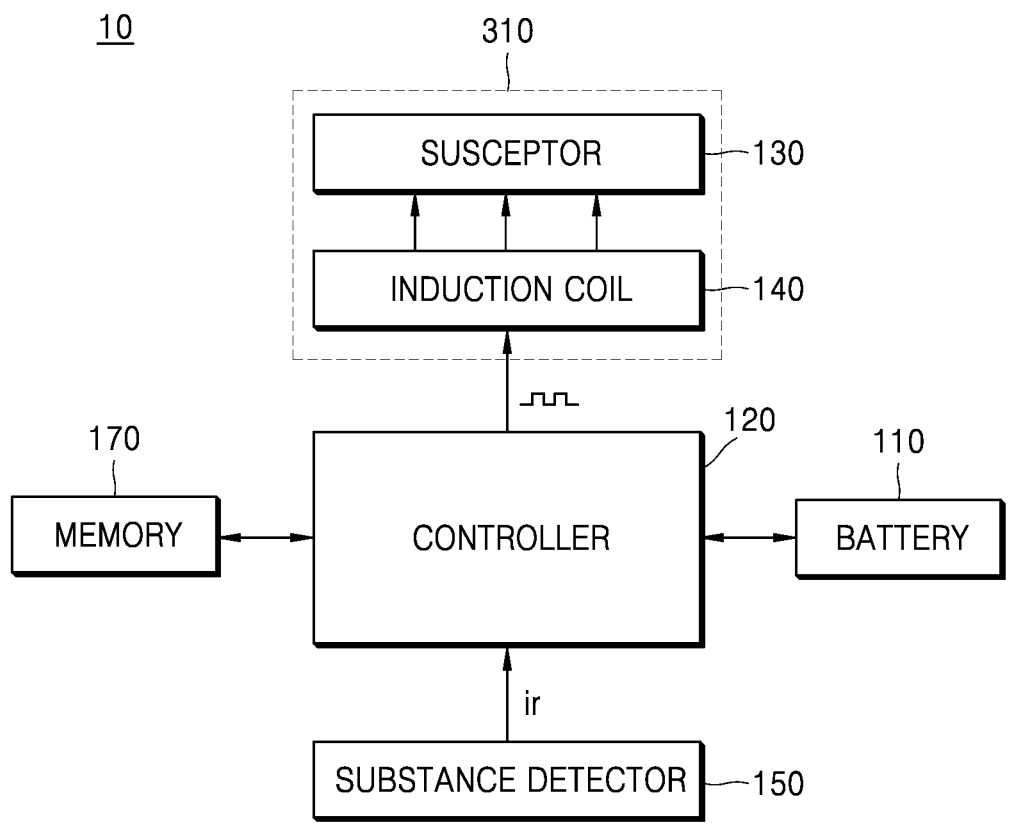

【Figure 3】
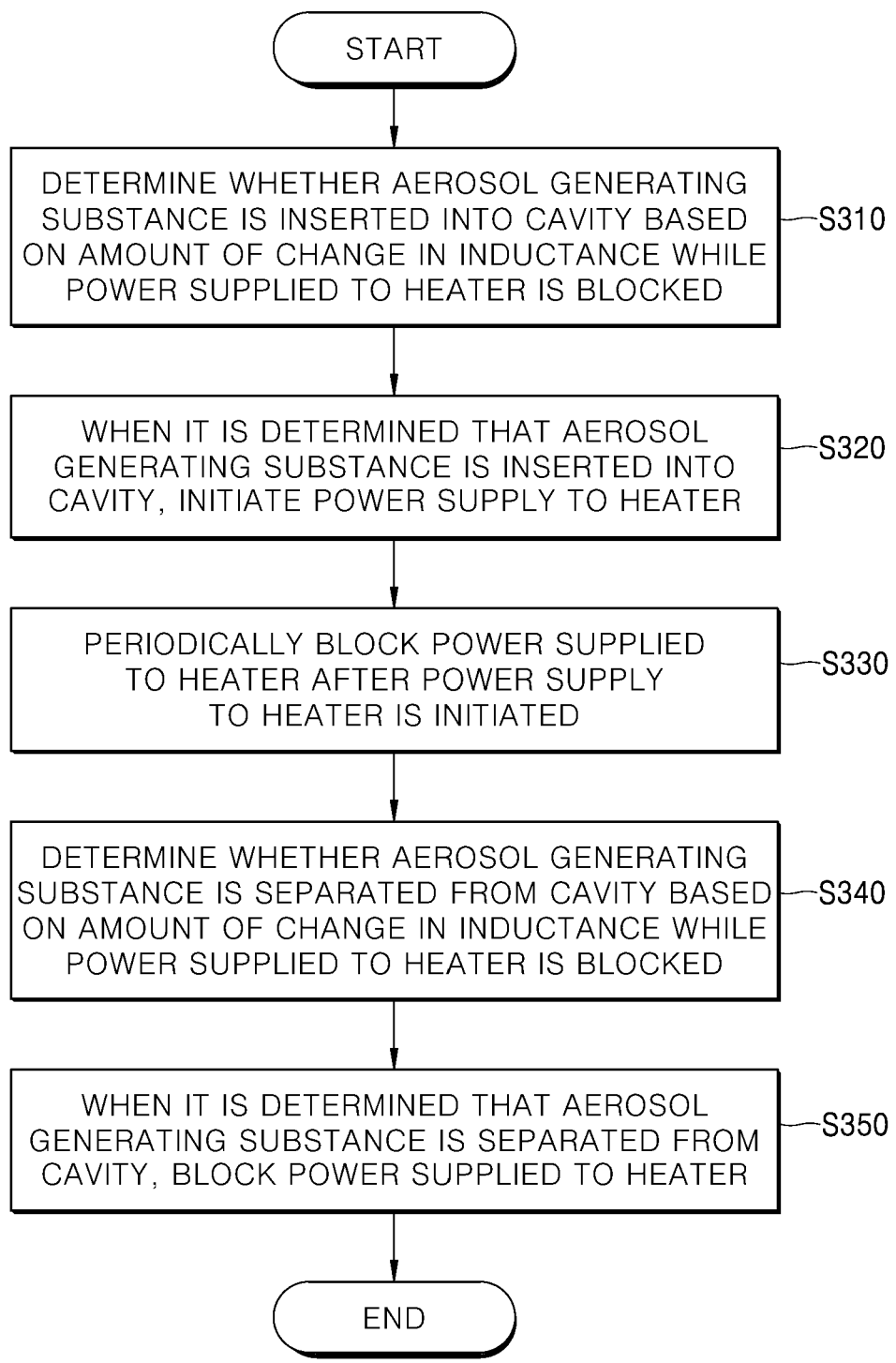

【Figure 4】
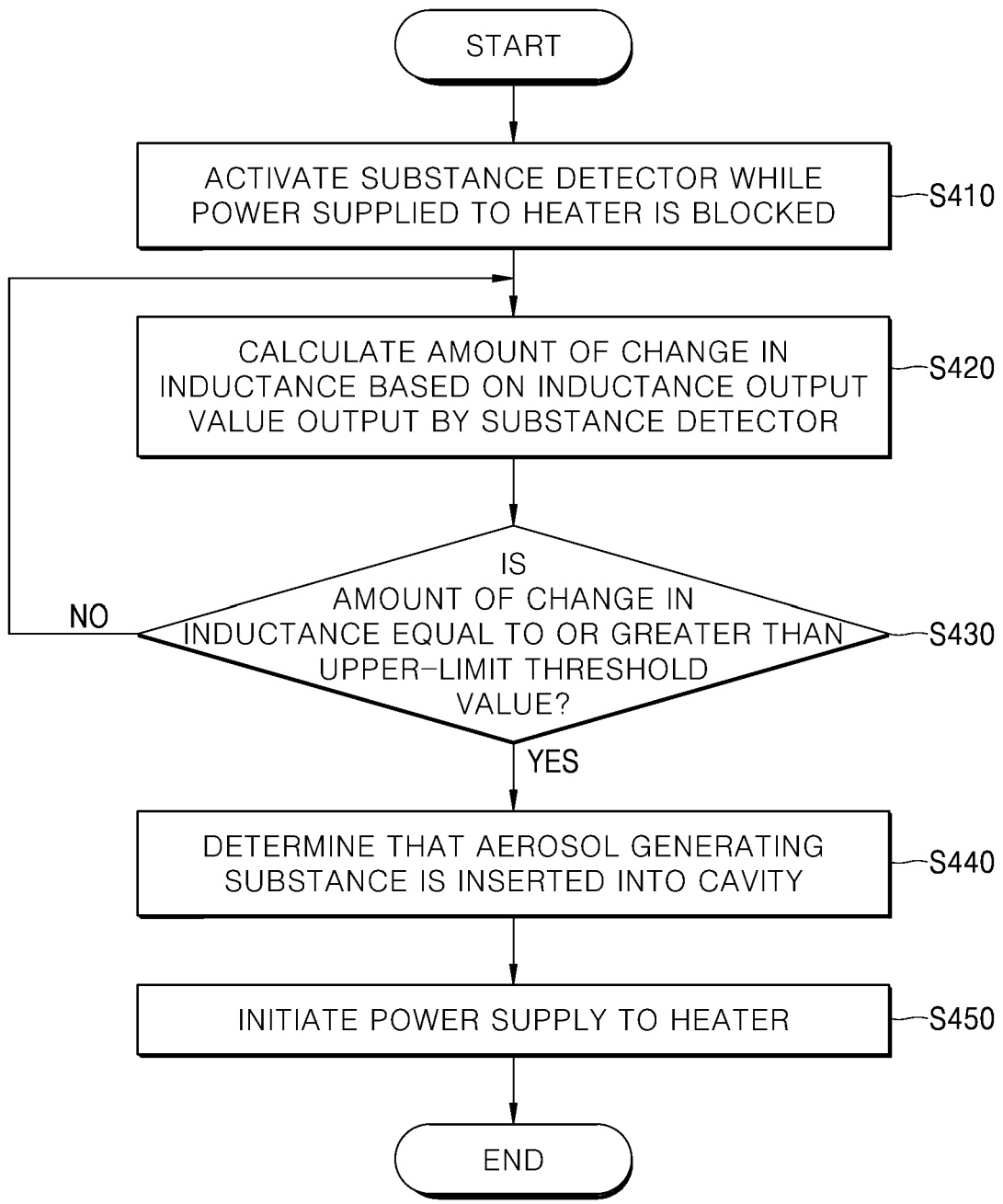

【Figure 5】
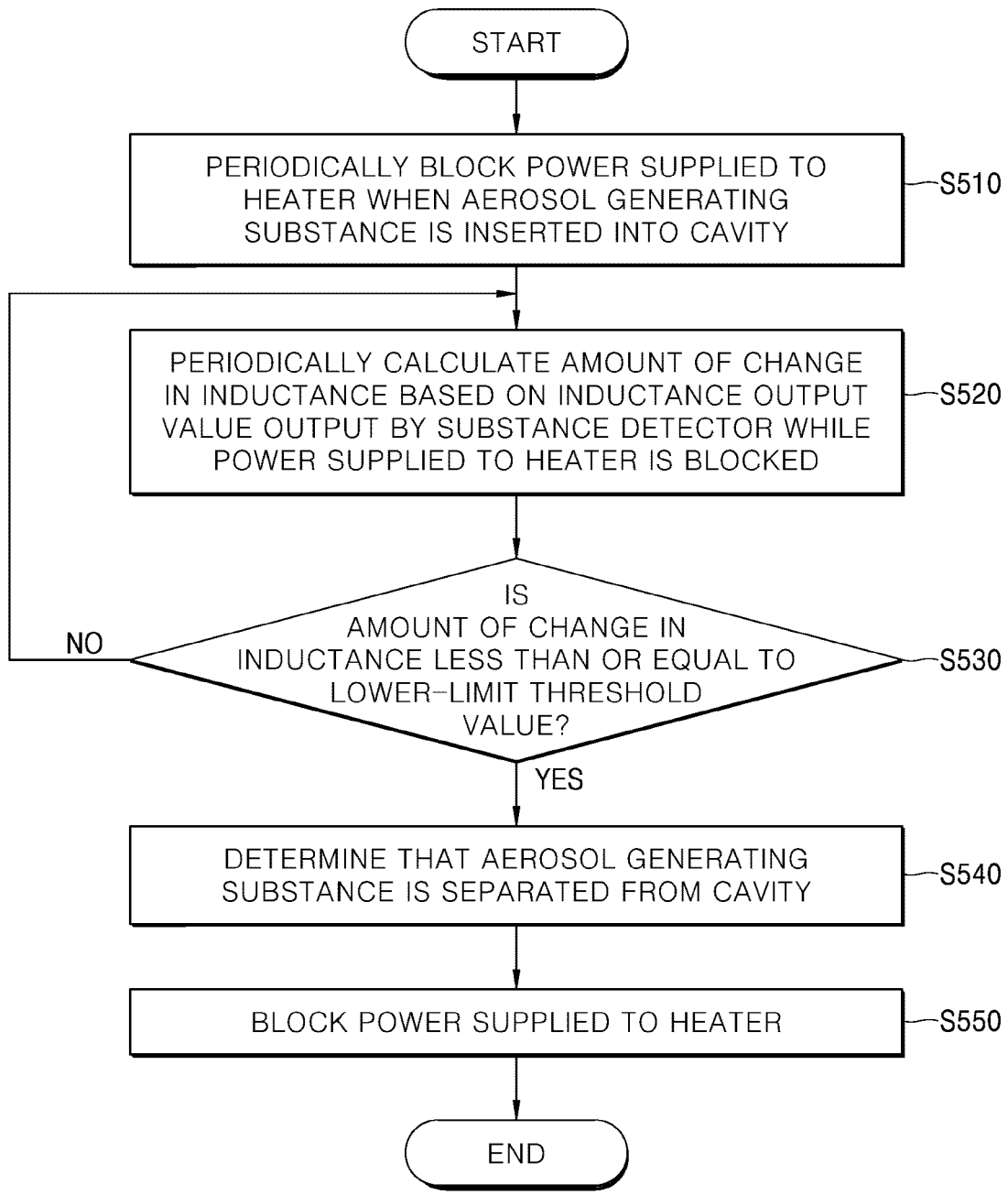

【Figure 6】
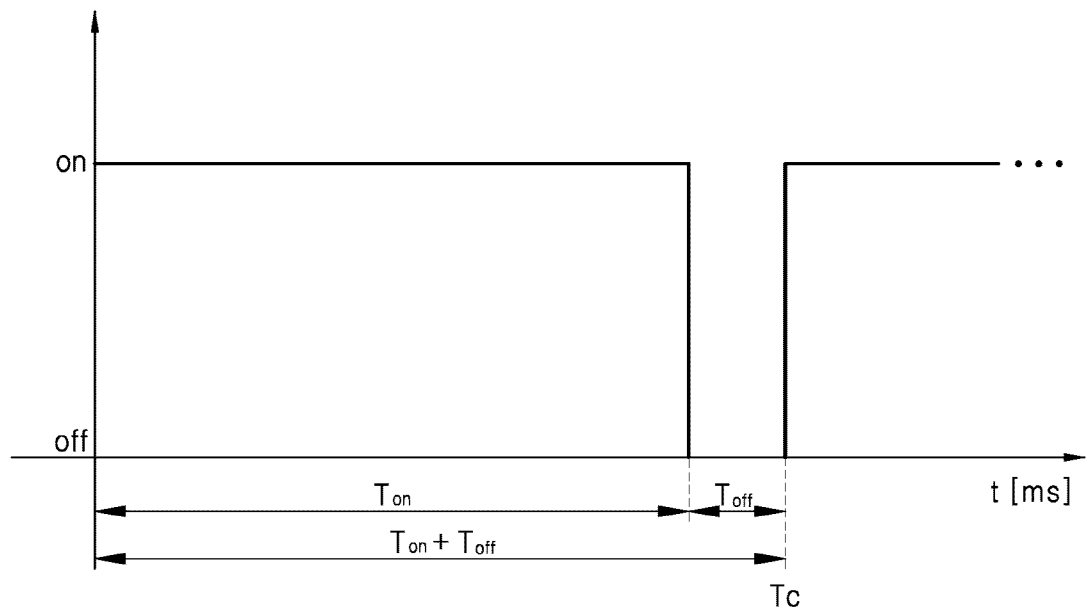
【Figure 7】
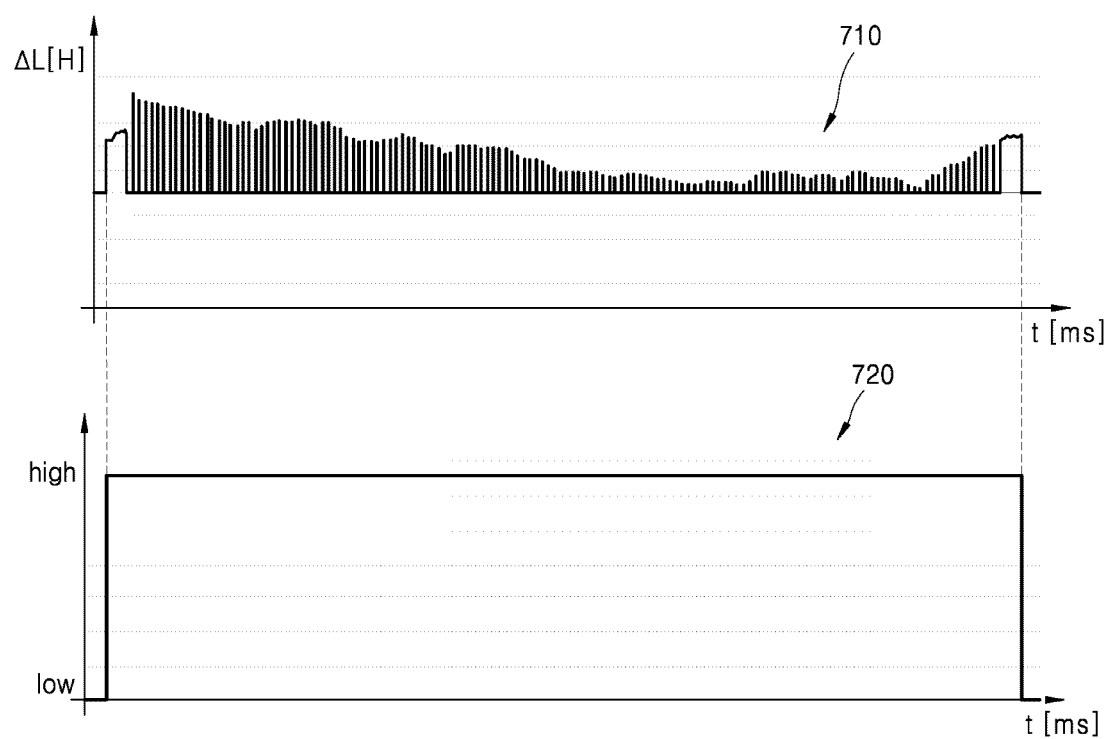

AEROSOL GENERATING DEVICE AND SYSTEM

CROSS REFERENCE TO RELATED APPLICATIONS

This application is a National Stage of International Application No. PCT/KR2020/018379, filed Dec. 15, 2020, claiming priority to Korean Patent Application No. 10-2020-0013739, filed Feb. 5, 2020.

TECHNICAL FIELD

One or more embodiments relate to an aerosol generating device and system, and more particularly, to an aerosol generating device and system capable of more precisely determining separation of an aerosol generating substance.

BACKGROUND ART

Recently, there is a growing demand for alternative methods for resolving problems of a common cigarette. For example, there is an increasing demand for a method of generating aerosols by heating an aerosol generating material in cigarettes or liquid storages rather than by combusting cigarettes.

Such an aerosol generating device may detect the presence or absence of a cigarette through an inductive sensor and heat a heater based on the presence or absence of the cigarette.

However, when a cigarette is heated through induction heating of the background art, a variable magnetic field generated by an induction coil acts as a noise component of the inductive sensor, and thus the presence of the cigarette cannot be accurately detected.

SUMMARY

A. Technical Problem

One or more embodiments provide aerosol generating device and system capable of accurately detecting the presence or absence of an aerosol generating substance by controlling power supplied to a heater.

The technical problems solved by embodiments of the present disclosure are not limited to the above-described description, and other technical problems may be understood from the embodiments to be described hereinafter.

B. Technical Solution

According to one or more embodiments, an aerosol generating device may include a cavity configured to accommodate an aerosol generating substance; a heater configured to heat the aerosol generating substance inserted into the cavity; a substance detector configured to detect a change in inductance that occurs in response to insertion and separation of the aerosol generating substance; and a controller configured to determine separation of the aerosol generating substance based on an amount of change in the inductance while power is blocked from being supplied to the heater.

According to one or more embodiments, an aerosol generating system may include an aerosol generating substance; and an aerosol generating device including a susceptor provided to surround a cavity in which the aerosol generating substance is accommodated; and an induction coil configured to generate a variable magnetic field to heat the susceptor, wherein the aerosol generating device may further include a substance detector configured to detect a change in inductance that occurs in response to insertion and separation of the aerosol generating substance; and a controller configured to determine separation of the aerosol generating substance based on an amount of change in the inductance while power is blocked from being supplied to the induction coil.

C. Advantageous Effects

An aerosol generating device and system according to one or more embodiments periodically block power from being supplied to a heater and periodically detects a change in inductance while power is blocked, thereby completely removing a noise component of an inductive sensor caused by a variable magnetic field generated by the heater.

Also, since the aerosol generating device and system calculate an amount of change in the inductance after the noise component of the inductive sensor is removed, it is possible to more accurately determine separation of a cigarette.

Also, the aerosol generating device and system set a power supply time to be longer than a power block time, thereby preventing the temperature of the heater from being rapidly dropped.

Also, the aerosol generating device and system prevent a sudden change of the temperature of the heater, thereby accurately determining separation of a cigarette without deteriorating smoking flavor of a user.

Also, when a cigarette is separated, the aerosol generating device and system block power from being supplied to the heater, thereby preventing the aerosol generating device from being over-heated and significantly reducing power consumption.

Effects by embodiments of the present disclosure are not limited to the above-described effects, and effects that are not mentioned will be clearly understood by one of ordinary skill in the art from the present specification and the accompanying drawings.

DESCRIPTION OF DRAWINGS

FIG. 1 is a diagram showing an aerosol generating system according to one or more embodiments.

FIG. 2 is an internal block diagram of an aerosol generating device according to one or more embodiments.

FIG. 3 is a flowchart of an operating method of an aerosol generating device according to one or more embodiments.

FIG. 4 is a flowchart for describing a method of detecting insertion of an aerosol generating substance and a method of controlling a heater when an aerosol generating substance is inserted, according to one or more embodiments.

FIG. 5 is a flowchart for describing a method of detecting separation of an aerosol generating substance and a method of controlling a heater when an aerosol generating substance is separated, according to one or more embodiments.

FIG. 6 is a diagram for describing a power block time and a power supply time, according to one or more embodiments;

FIG. 7 is a diagram for describing a method of calculating an amount of change in inductance, according to one or more embodiments.

BEST MODE

According to one or more embodiments, an aerosol generating device is provided. The aerosol generating device includes: a body that includes a cavity configured to accommodate an aerosol generating substance; a heater configured to heat the aerosol generating substance inserted into the cavity; a substance detector configured to detect a change in inductance that occurs in response to insertion to the cavity and separation from the cavity of the aerosol generating substance; and a controller configured to determine that the aerosol generating substance is separated from the cavity based on an amount of the change in the inductance, while power is blocked from being supplied to the heater.

According to an embodiment, the controller is further configured to: activate the substance detector while the power is blocked from being supplied to the heater, calculate the amount of the change in the inductance based on an inductance output value output by the substance detector, and determine that the aerosol generating substance is inserted into the cavity based on the amount of the change in the inductance being equal to or greater than a pre-set upper-limit threshold value.

According to an embodiment, the controller is further configured to initiate power supply to the heater based on determining that the aerosol generating substance is inserted into the cavity.

According to an embodiment, the controller is further configured to: periodically block the power from being supplied to the heater, based on the aerosol generating substance being inserted into the cavity, while the power is periodically blocked from being supplied to the heater, periodically calculate the amount of the change in the inductance based on inductance output values output by the substance detector, and determine that the aerosol generating substance is separated from the cavity based on the amount of the change in the inductance periodically calculated.

According to an embodiment, the controller is further configured to: supply the power to the heater based on a power supply time of a periodic control signal; and block the power from being supplied to the heater based on a power block time of the periodic control signal, wherein the power block time is shorter than the power supply time during one period of the periodic control signal.

According to an embodiment, the controller is further configured to calculate the amount of the change in the inductance based on the inductance output values output by the substance detector during the power block time.

According to an embodiment, the controller is further configured to determine that the aerosol generating substance is separated from the cavity based on the amount of the change in the inductance being less than or equal to a pre-set lower-limit threshold value.

According to an embodiment, the controller is further configured to block the power from being supplied to the heater based on determining that the aerosol generating substance is separated from the cavity.

According to one or more embodiments, an aerosol generating system is provided. The aerosol generating system includes: an aerosol generating substance; and an aerosol generating device. The aerosol generating device includes: a susceptor that surrounds a cavity of the aerosol generating device in which the aerosol generating substance is configured to be accommodated; an induction coil configured to generate a variable magnetic field to heat the susceptor; a substance detector configured to detect a change in inductance that occurs in response to insertion to the cavity and separation from the cavity of the aerosol generating substance; and a controller configured to determine that the aerosol generating substance is separated from the cavity based on an amount of the change in the inductance, while power is blocked from being supplied to the induction coil.

According to an embodiment, the controller is further configured to: activate the substance detector while the power is blocked from being supplied to the induction coil, calculate the amount of the change in the inductance based on an inductance output value output by the substance detector, and, determine that the aerosol generating substance is inserted into the cavity based on the amount of the change in the inductance being equal to or greater than a pre-set upper-limit threshold value.

According to an embodiment, the controller is further configured to initiate power supply to the induction coil based on determining that the aerosol generating substance is inserted into the cavity.

According to an embodiment, the controller is further configured to: periodically block the power from being supplied to the induction coil, based on the aerosol generating substance being inserted into the cavity, while the power is periodically blocked from being supplied to the induction coil, periodically calculate the amount of the change in the inductance based on inductance output values output by the substance detector, and determine that the aerosol generating substance is separated from the cavity based on the amount of the change in the inductance periodically calculated.

According to an embodiment, the controller is further configured to: supply the power to the induction coil based on a power supply time of a periodic control signal; and block the power from being supplied to the induction coil based on a power block time of the periodic control signal, wherein the power block time is shorter than the power supply time during one period of the periodic control signal.

According to an embodiment, the controller is further configured to calculate the amount of the change in the inductance based on the inductance output values output by the substance detector during the power block time.

According to an embodiment, the controller is further configured to determine that the aerosol generating substance is separated from the cavity based on the amount of the change in the inductance being less than or equal to a pre-set lower-limit threshold value.

DETAILED DESCRIPTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, there is also a term arbitrarily selected by the applicant, in which case the meaning will be described in detail in the description of one or more embodiments. Therefore, the terms used to describe one or more embodiments should be defined based on the meanings of the terms and the descriptions of the one or more embodiments, rather than simply the names of the terms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Throughout the specification, "puff" refers to an inhalation of a user, and the inhalation may refer to a situation of drawing air and/or aerosol to the user's mouth, nasal cavity, or lung through the user's mouth or nose.

Throughout the specification, a pre-heating period refers to a period for increasing temperatures of a first heater and a second heater, and a smoking period may refer to a period for maintaining the temperature of the first heater and a period during which a user performs inhalation. Hereinafter, a pre-heating period and a smoking period may have the same meaning as a pre-heating time and a smoking time, respectively.

Hereinafter, example embodiments of the present disclosure will now be described more fully with reference to the accompanying drawings, such that one of ordinary skill in the art may easily work the present disclosure. Embodiments of the present disclosure may, however, be embodied in many different forms and should not be construed as being limited to the example embodiments set forth herein.

Hereinafter, embodiments of one or more embodiments will be described in detail with reference to the drawings.

FIG. 1 is a diagram showing an aerosol generating system according to one or more embodiments.

Referring to FIG. 1, an aerosol generating system 1 may include an aerosol generating device 10 and a cigarette 20. The aerosol generating device 10 may include a cavity 160 into which the cigarette 20 is inserted and may generate aerosol by heating the cigarette 20 inserted into the cavity 160. The cigarette 20 may be a cigarette and may include an aerosol generating material.

The aerosol generating device 10 may include a battery 110, a controller 120, a susceptor 130, an induction coil 140, and a substance detector 150. However, the internal structure of the aerosol generating device 10 is not limited to the components illustrated in FIG. 1. According to embodiments of the aerosol generating device 10, it will be understood by one of ordinary skill in the art that some of the hardware components shown in FIG. 1 may be omitted or new components may be added.

The battery 110 supplies electric power used for the aerosol generating device 10 to operate. For example, the battery 110 may supply power, such that the induction coil 140 may generate a variable magnetic field. In addition, the battery 110 may supply power for operation of other hardware components included in the aerosol generating device 10, that is, various sensors (not shown), a user interface (not shown), a memory (not shown), and the controller 120. The battery 110 may be a rechargeable battery or a disposable battery. For example, the battery 110 may be a lithium polymer (LiPoly) battery, but is not limited thereto.

The controller 120 is a hardware component configured to control general operations of the aerosol generating device 10. For example, the controller 120 controls not only operations of the battery 110, the susceptor 130, the induction coil 140, and the substance detector 150, but also operations of other components included in the aerosol generating device 10. The controller 120 may also check the status of each of the components of the aerosol generating device 10 and determine whether the aerosol generating device 10 is in an operable state.

The controller 120 includes at least one processor. A processor can be implemented as an array of a plurality of logic gates or can be implemented as a combination of a general-purpose microprocessor and a memory in which a program executable in the microprocessor is stored. Also, it may be understood by one of ordinary skill in the art that the processor may be implemented as other types of hardware.

The susceptor 130 may include a material that is heated as a variable magnetic field is applied thereto. For example, the susceptor 130 may include a metal or carbon. The susceptor 130 may include at least one of ferrite, a ferromagnetic alloy, stainless steel, and aluminum (Al). Furthermore, the susceptor 130 may also include graphite, molybdenum, silicon carbide, niobium, niobium, a nickel alloy, a metal film, a ceramic like zirconia, a transition metal such as nickel (Ni) and cobalt (Co), and a metalloid like boron (B) and phosphorus (P). However, one or more embodiments are not limited thereto.

In an embodiment, the susceptor 130 may have a tubular shape or a cylindrical shape and may be provided to surround the cavity 160 into which the cigarette 20 is inserted. The susceptor 130 may be provided to surround the cigarette 20 when the cigarette 20 is inserted into the cavity 160 of the aerosol generating device 10. Therefore, the temperature of an aerosol generating material in the cigarette 20 may be increased by heat transmitted from the susceptor 130 outside the cigarette 20.

The induction coil 140 may generate a variable magnetic field as power is supplied from the battery 110. The variable magnetic field generated by the induction coil 140 may be applied to the susceptor 130, and thus the susceptor 130 may be heated. Power supplied to the induction coil 140 may be adjusted under the control of the controller 120, and a temperature at which the susceptor 130 is heated may be properly maintained.

The substance detector 150 may detect whether the cigarette 20 is inserted into the cavity 160. The substance detector 150 may detect the changes in inductance due to insertion and separation of the cigarette 20. To this end, the cigarette 20 may include an electromagnetic inductor 210. The electromagnetic inductor 210 may change the inductance of the substance detector 150. The electromagnetic inductor 210 may include a conductor capable of inducing an eddy current and a magnetic material capable of inducing a magnetic flux change. For example, the electromagnetic inductor 210 may include a metallic material, a magnetic ink, a magnetic tape, etc. Also, the electromagnetic inductor 210 may be a metal like aluminum. However, one or more embodiments are not limited thereto, and the electromagnetic inductor 210 may include materials that change the inductance of the substance detector 451 without limitation.

The substance detector 150 may include a detection coil (not shown), and may convert a frequency value that varies due to insertion and separation of the cigarette 20 into an inductance output value, and output the inductance output value.

The controller 120 calculates an amount of change in the inductance based on the inductance output value output by the substance detector 150 and may determine whether the cigarette 20 is inserted or separated based on the change in inductance.

When insertion of the cigarette 20 is detected, the controller 120 may automatically perform a heating operation without an additional external input. For example, when the controller 120 detects that the cigarette 20 is inserted by using the substance detector 150, the controller 120 may control the battery 110 to supply power to the induction coil 140. As a variable magnetic field is generated by the induction coil 140, the susceptor 130 may be heated. Therefore, the cigarette 20 provided inside the susceptor 130 may be heated, and thus aerosol may be generated.

The cigarette 20 may be a cigarette similar to a typical burning cigarette. For example, the cigarette 20 may include a first portion containing an aerosol generating material and a second portion including a filter and the like. Alternatively, an aerosol generating material may also be included in the second portion of the cigarette 20. For example, an aerosol generating material made in the form of granules or capsules may be inserted into the second portion.

The entire first portion may be inserted into the aerosol generating device 10, and the second portion may be exposed to the outside. Alternatively, only a portion of the first portion may be inserted into the aerosol generating device 10, or the entire first portion and a portion of the second portion may be inserted into the aerosol generating device 10. The user may puff aerosol while holding the second portion by the mouth of the user. At this time, the aerosol is generated as the outside air passes through the first portion, and the generated aerosol passes through the second portion and is delivered to a user's mouth.

For example, the outside air may be introduced through at least one air passage formed in the aerosol generating device 10. For example, the opening and closing of the air passage formed in the aerosol generating device 10 and/or the size of the air passage may be adjusted by a user. Accordingly, the amount of smoke and a smoking impression may be adjusted by the user. In another example, the outside air may be introduced into the cigarette 20 through at least one hole formed in the surface of the cigarette 20.

Meanwhile, the aerosol generating device 10 may further include components other than the battery 110, the controller 120, the susceptor 130, the induction coil 140, and the substance detector 150. For example, the aerosol generating device 10 may further include sensors other than the substance detector 150 (e.g., a temperature sensor, a puff sensor, etc.) and a user interface. Also, the aerosol generating device 10 may be fabricated to have a structure in which the outside air may flow in or gases therein may flow out even in the state where the cigarette 20 is inserted.

The user interface may provide the user with information about the state of the aerosol generating device 10. The user interface may include various interfacing devices, such as a display or a lamp for outputting visual information, a motor for outputting tactile information, a speaker for outputting sound information, input/output (I/O) interfacing devices (e.g., a button or a touch screen) for receiving information input from a user or outputting information to the user. Also, the user interface may include various interfacing units, such as terminals for performing data communication or receiving charging power and communication interfacing modules for performing wireless communication (e.g., Wi-Fi, Wi-Fi direct, Bluetooth, near-field communication (NFC), etc.) with external devices.

According to embodiments, the aerosol generating device 10 may be implemented by selecting only some of various examples of user interfaces described above. In addition, the aerosol generating device 10 may be implemented by combining at least some of various examples of user interfaces described above. For example, the aerosol generating device 10 may include a touch screen display capable of receiving a user input while outputting visual information through a front surface. The touch screen display may include a fingerprint sensor, and user authentication may be performed by the fingerprint sensor.

Although not illustrated in FIG. 1, the aerosol generating device 10 and an additional cradle may together form a system. For example, the cradle may be used to charge the battery 110 of the aerosol generating device 10. Alternatively, the induction coil 140 may be heated while the cradle and the aerosol generating device 10 are coupled to each other.

FIG. 2 is an internal block diagram of an aerosol generating device according to one or more embodiments.

Referring to FIG. 2, the aerosol generating device 10 may include the battery 110, the controller 120, the susceptor 130, the induction coil 140, the substance detector 150, and a memory 170. FIG. 2 illustrates some components of the aerosol generating device 10. However, it will be understood by one of ordinary skill in the art pertaining to embodiments of the present disclosure that other elements may be further included in the aerosol generating device 10 in addition to the elements illustrated in FIG. 2. Hereinafter, descriptions identical to those already given above with reference to FIG. 1 will be omitted.

The substance detector 150 may detect whether an aerosol generating substance is present in the cavity 160. The substance detector 150 may detect the changes in inductance due to insertion and separation of the aerosol generating substance 20. The aerosol generating substance 20 may be a cigarette as shown in FIG. 1.

The substance detector 150 may include an inductive sensor for detecting changes in inductance due to insertion and separation of the aerosol generating substance 20. In this case, the aerosol generating substance 20 may include the electromagnetic inductor 210 that may be detected by the inductive sensor. For example, at least one of a plurality of wrappers included in the aerosol generating substance 20 may be an aluminum foil.

The substance detector 150 may transmit an interrupt signal ir indicating changes in inductance due to insertion and separation of the aerosol generating substance 20 to the controller 120.

The controller 120 may detect whether the aerosol generating substance 20 is inserted or separated based on the interrupt signal ir output from the substance detector 150. Also, the controller 120 may identify the type of a metal contained in the aerosol generating substance 20 based on an inductance output value output by the substance detector 150 and determine authenticity and/or type of the aerosol generating substance 20 based on the type of the metal.

While power is blocked from being supplied to the heater 310 in the standby mode, the controller 120 may determine whether the aerosol generating substance 20 is inserted into the cavity 160 based on a change in inductance output by the substance detector 150.

The controller 120 may determine that the aerosol generating substance 20 is inserted into the cavity 160 when the amount of change in the inductance is equal to or greater than a pre-set upper-limit threshold value.

When it is determined that the aerosol generating substance 20 is inserted into the cavity 160, the controller 120 may start supplying power to the heater 310. In this case, the heater 310 may be a component including the susceptor 130 and the induction coil 140.

The controller 120 may control power supplied to the heater 310 through a pulse width modulation (PWM). To this end, the controller 120 may include a PWM module.

The controller 120 may periodically block power from being supplied to the heater 310 after power supply to the heater 310 is started. The reason thereof is to remove noise components of the substance detector 150 generated by the induction coil 140.

When power supply to the heater 310 is started, the controller 120 may determine whether the aerosol generating substance 20 is separated based on the amount of change in the inductance output during a pre-set power block time. The controller 120 may determine that the aerosol generating substance 20 is separated from the cavity 160 when the amount of change in the inductance output during the pre-set power block time is less than or equal to a pre-set lower-limit threshold value.

When it is determined that the aerosol generating substance 20 is separated from the cavity 160, the controller 120 may block power from being supplied to the heater 310.

The memory 170 may be a hardware component configured to store various pieces of data processed in the aerosol generating device 10, and the memory 170 may store data processed or to be processed by the controller 120. The memory 170 may include various types of memories, such as random access memory (e.g., dynamic random access memory (DRAM), static random access memory (SRAM), etc.), read-only memory (ROM), electrically erasable programmable read-only memory (EEPROM), etc.

The memory 170 may store an upper-limit threshold value and a lower-limit threshold value of the amount of change in the inductance for determining whether the aerosol generating substance 20 is present. The memory 170 may store an operation time of the aerosol generating device 10, the maximum number of puffs, the current number of puffs, at least one temperature profile, data on a user's smoking pattern, etc.

FIG. 3 is a flowchart of a method of operating an aerosol generating device according to one or more embodiments.

Referring to FIG. 3, a method of operating the aerosol generating device 10 includes operations processed in a time series in the aerosol generating device 10 shown in FIGS. 1 and 2. Accordingly, it may be understood that, even though descriptions are omitted below, the descriptions regarding the aerosol generating device 10 of FIGS. 1 and 2 given above may also be applied to the method described with respect to FIG. 3.

In operation S310, the controller 120 may determine whether the aerosol generating substance 20 is inserted into the cavity 160 based on the amount of change in the inductance while power is blocked from being supplied to the heater 310.

The controller 120 may determine that the aerosol generating substance 20 is inserted into the cavity 160 when the amount of change in the inductance is equal to or greater than a pre-set upper-limit threshold value while power is blocked from being supplied to the heater 310.

When it is determined that the aerosol generating substance 20 is not inserted into the cavity 160, the controller 120 may wait until the aerosol generating substance 20 is inserted into the cavity 160.

Operation S310 may be performed in a standby mode. The standby mode refers to any mode in which power is blocked from being supplied to remaining components other than components for detecting insertion of the aerosol generating substance 20 (e.g., a substance detector, etc.) before the aerosol generating substance 20 is inserted into the cavity 160, and the standby mode of one or more embodiments is not limited by its name. For example, the standby mode may be a power saving mode, a sleep mode, etc.

In operation S320, when it is determined that the aerosol generating substance 20 is inserted into the cavity 160, the controller 120 may start supplying power to the heater 310.

When it is determined that the aerosol generating substance 20 is inserted into the cavity 160, the controller 120 may automatically supply power to the induction coil 140 without an additional external input. The controller 120 may control power supplied to the induction coil 140 through a PWM. A method of detecting whether an aerosol generating substance 20 is inserted and a method of controlling the heater 310 when the aerosol generating substance 20 is inserted will be described below in more detail with reference to FIG. 4.

Meanwhile, since the substance detector 150 includes a detection coil, when power is supplied to the induction coil 140, a variable magnetic field generated by the induction coil 140 may affect the detection coil. In other words, when power is supplied to the induction coil 140, the variable magnetic field generated by the induction coil 140 induces an induced current to the detection coil as well, and thus the inductance output value of the substance detector 150 may be changed. Since an induced current induced by the induction coil 140 acts as a noise component of the substance detector 150, when the amount of change in the inductance is calculated without removing this noise component, separation of the aerosol generating substance 20 may not be accurately determined.

In order to remove the noise component of the substance detector 150 caused by the induction coil 140, the aerosol generating device 10 of embodiments of the present disclosure may periodically block power supply to the heater 310 and determine separation of the aerosol generating substance 20 based on an inductance output value output by the substance detector 150 during a pre-set power block time.

In detail, after the controller 120 starts supplying power to the heater 310 in operation S330, power may be periodically blocked from being supplied to the heater 310.

For example, the controller 120 may block power from being supplied to the heater 310 for 100 ms every 1900 ms, but one or more embodiments are not limited thereto.

In operation S340, the controller 120 may determine whether the aerosol generating substance 20 is separated from the cavity 160 based on the amount of change in the inductance while power is blocked from being supplied to the heater 310.

The controller 120 may determine whether the aerosol generating substance 20 is separated based on the amount of change in the inductance output during a pre-set power block time. For example, when the controller 120 blocks power from being supplied to the induction coil 140 for 100 ms every 1900 ms, it may be determined whether the aerosol generating substance 20 is separated based on the amount of change in the inductance for 100 ms.

The controller 120 may determine that the aerosol generating substance 20 is separated from the cavity 160 when the amount of change in the inductance output during the pre-set power block time is less than or equal to a pre-set lower-limit threshold value.

Since the aerosol generating device 10 of an embodiment of the present disclosure calculates the amount of change in the inductance of the substance detector 150 while power is blocked from being supplied to the induction coil 140, a noise component of the substance detector 150 generated by the induction coil 140 may be completely removed, and thus it is possible to accurately determine whether the aerosol generating substance 20 is separated.

In operation S350, when it is determined that the aerosol generating substance 20 is separated from the cavity 160, the controller 120 may block power from being supplied to the heater 310.

When it is determined that the aerosol generating substance 20 is separated from the cavity 160, the controller 120 may automatically block power from being supplied to the induction coil 140 without an additional external input. A method of detecting whether an aerosol generating substance 20 is separated and a method of controlling the heater 310 when the aerosol generating substance 20 is separated will be described below in more detail with reference to FIG. 5.

FIG. 4 is a flowchart for describing a method of detecting insertion of an aerosol generating substance and a method of controlling a heater when an aerosol generating substance is inserted.

Referring to FIG. 4, in operation S410, the controller 120 may activate the substance detector 150 while power is blocked from being supplied to the heater 310.

The controller 120 may block power from being supplied to the heater 310 and supply power to the substance detector 150 in the standby mode. The controller 120 may periodically collect inductance output values of the substance detector 150 after the substance detector 150 is activated. A period for collecting inductance output values may be appropriately set based on power consumption, an amount of change in inductance, etc. For example, the controller 120 may collect inductance output values of the substance detector 451 at the interval of 100 ms, but one or more embodiments are not limited thereto.

In operation S420, the controller 120 may calculate the amount of change in the inductance based on inductance output values output by the substance detector 150.

In detail, since the aerosol generating substance 20 includes the electromagnetic inductor 210, when the aerosol generating substance 20 is inserted into the cavity 160, the inductance of a detection coil included in the substance detector 150 may be increased.

The substance detector 150 may output an inductance output value to the controller 410 as an interrupt signal ir. The controller 120 may calculate an inductance increase based on the interrupt signal ir.

In operation S430, the controller 120 may compare the amount of change in the inductance with an upper-limit threshold value.

The upper-limit threshold value may be set in consideration of self-inductance of the substance detector 150 and mutual inductance between the detection coil of the substance detector 150 and the aerosol generating substance 20. For example, the upper-limit threshold value may be, but is not limited to, +0.32 mH.

In operation S440, the controller 120 may determine that the aerosol generating substance 20 is inserted into the cavity 160 when the amount of change in the inductance is equal to or greater than a pre-set upper-limit threshold value.

Alternatively, when the amount of change in the inductance is less than the pre-set upper-limit threshold value, the controller 120 may determine that the aerosol generating substance 20 is not inserted into the cavity 160 and continuously maintain the standby mode. In other words, the controller 120 may periodically collect inductance output values of the substance detector 150 while power is being supplied to the substance detector 150 and calculate the amount of change in the inductance based on the collected inductance output values.

In operation S450, when it is determined that the aerosol generating substance 20 is inserted into the cavity 160, the controller 120 may start supplying power to the heater 310.

In one embodiment, the controller 120 may output a trigger signal for heating the aerosol generating substance 20 to the induction coil 140 when it is determined that the aerosol generating substance 20 is inserted into the cavity 160. The trigger signal may be a signal modulated through a PWM method. In other words, when the aerosol generating substance 20 is inserted into the cavity 160, the heater 310 may be automatically heated without an additional external input. The aerosol generating device 10 according to one or more embodiments recognizes the aerosol generating substance 20 and automatically heats the heater 310, thereby increasing user convenience.

FIG. 5 is a flowchart for describing a method of detecting separation of an aerosol generating substance and a method of controlling a heater when an aerosol generating substance is separated. FIG. 6 is a diagram for describing a power block time and a power supply time that may be applied to the method described with respect to FIG. 5, according to embodiments. FIG. 7 is a diagram for describing a method of calculating the amount of change in the inductance that may be applied to the method described with respect to FIG. 5, according to embodiments.

Referring to FIG. 5, in operation S510, when the aerosol generating substance 20 is inserted into the cavity 160, the controller 120 may periodically block power from being supplied to the heater 310.

The controller 120 may supply power and block power from being supplied to the heater 310 based on a periodic control signal.

FIG. 6 is a diagram showing a periodic control signal.

In FIG. 6, during one period Tc of the periodic control signal, power is supplied to the heater 310 when the control signal is turned on and power is blocked from being supplied to the heater 310 when the control signal is turned off. In other words, the controller 120 may supply power and block power from being supplied to the heater 310 based on a periodic control signal. For example, the controller 120 may block power from being supplied to the heater 310 for 100 ms every 1900 ms. When power is blocked from being supplied to the heater 310, the noise component due to the induction coil 140 may be completely removed from an inductance output value of the substance detector 150.

Meanwhile, in one period Tc of the periodic control signal, a power block time $T_{off}$ may be set to be shorter than a power supply time $T_{on}$. For example, the power supply time $T_{on}$ may be set to be 19 times or greater than the power block time $T_{off}$. Therefore, the aerosol generating device 10 according to one or more embodiments may prevent a rapid temperature drop of the heater 310, thereby preventing a deterioration of smoking flavor.

Referring back to FIG. 5, in operation S520, the controller 120 may periodically calculate the amount of change in the inductance based on inductance output values output by the substance detector 150 while power is blocked from being supplied to the heater 310.

The controller 120 may calculate the amount of change in the inductance based on inductance output values output by the substance detector 150 during the power block time $T_{off}$. For example, when the power supply time $T_{on}$ is 1900 ms and the power block time $T_{off}$ is 100 ms in one period Tc of a periodic control signal, the controller 120 may calculate the amount of change in the inductance for 100 ms.

The controller 120 may calculate the amount of change in the inductance based on inductance output values output by the substance detector 150 during the power block time $T_{off}$ of every period Tc.

FIG. 7 is a diagram showing a state graph 720 indicating an insertion state and a separation state of the aerosol generating substance 20 and a graph 710 of the amount of change in the inductance calculated by the controller 120 during the power block time $T_{off}$ of each period.

In FIG. 7, a state in which the aerosol generating substance 20 is inserted is shown as a high state, and a state in which the aerosol generating substance 20 is separated is shown as a low state.

As described above, when the aerosol generating substance 20 is inserted into the cavity 160, the controller 120 may periodically block power from being supplied to the heater 310 and calculate the amount of change in the inductance during the power block time $T_{off}$. Therefore, as shown in FIG. 7, the amount of change in the inductance may be periodically derived.

The controller 120 may determine whether the aerosol generating substance 20 is separated based on the amount of change in the inductance periodically calculated.

Meanwhile, since the aerosol generating substance 20 includes the electromagnetic inductor 210, when the aerosol generating substance 20 is separated from the cavity 160, the inductance of a detection coil included in the substance detector 150 may be decreased.

The substance detector 150 may output an inductance output value to the controller 410 as an interrupt signal ir. The controller 120 may calculate an inductance decrease based on the interrupt signal ir.

Referring back to operation S530 of FIG. 5, the controller 120 may compare the amount of change in the inductance with a lower-limit threshold value.

The lower-limit threshold value may be set in consideration of self-inductance of the substance detector 150 and mutual inductance between the detection coil of the substance detector 150 and the aerosol generating substance 20. For example, the lower-limit threshold value may be, but is not limited to, −0.32 mH.

Meanwhile, the absolute value of the lower-limit threshold value may be the same as the absolute value of the upper-limit threshold value of FIG. 4. When the absolute value of a lower-limit threshold value (e.g., a value th2) is set to be equal to the absolute value of an upper-limit threshold value (e.g., a value th1), insertion and separation of the aerosol generating substance 20 may be determined more accurately.

In operation S540, the controller 120 may determine that the aerosol generating substance 20 is separated from the cavity 160 when the amount of change in the inductance is less than or equal to a pre-set lower-limit threshold value.

Alternatively, the controller 410 may determine that the aerosol generating substance 20 is not separated from the cavity 160 when the amount of change in the inductance is greater than the pre-set lower-limit threshold value and may periodically calculate the amount of change in the inductance.

In operation S550, when it is determined that the aerosol generating substance 20 is separated from the cavity 160, the controller 120 may block power from being supplied to the heater 310.

In other words, when the aerosol generating substance 20 is separated from the cavity 160, heating of the heater 310 may be automatically stopped without an additional external input. The aerosol generating device 10 according to one or more embodiments recognizes separation of the aerosol generating substance 20 and automatically stops heating of the heater 310, thereby preventing the aerosol generating device 10 from being over-heated and significantly reducing power consumption.

The embodiments of the present disclosure may be written as computer programs and can be implemented in general-use digital computers that execute the programs using a computer readable recording medium. In addition, the structure of the data used in the above-described method may be recorded on a computer-readable recording medium through various means. Examples of the computer readable recording medium include magnetic storage media (e.g., ROM, RAM, USB drives, floppy disks, hard disks, etc.), optical recording media (e.g., CD-ROMs, or DVDs), etc.

Those of ordinary skill in the art related to embodiments of the present disclosure may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol generating device comprising:
    a body that includes a cavity configured to accommodate an aerosol generating substance;
    a heater configured to heat the aerosol generating substance inserted into the cavity;
    a substance detector configured to detect a change in inductance that occurs in response to insertion to the cavity and separation from the cavity of the aerosol generating substance; and
    a controller configured to determine that the aerosol generating substance is separated from the cavity based on an amount of the change in the inductance, while power is blocked from being supplied to the heater.

2. The aerosol generating device of claim 1, wherein the controller is further configured to:
    activate the substance detector while the power is blocked from being supplied to the heater,
    calculate the amount of the change in the inductance based on an inductance output value output by the substance detector, and
    determine that the aerosol generating substance is inserted into the cavity based on the amount of the change in the inductance being equal to or greater than a pre-set upper-limit threshold value.

3. The aerosol generating device of claim 1, wherein the controller is further configured to initiate power supply to the heater based on determining that the aerosol generating substance is inserted into the cavity.

4. The aerosol generating device of claim 1, wherein the controller is further configured to:
- periodically block the power from being supplied to the heater, based on the aerosol generating substance being inserted into the cavity,
- while the power is periodically blocked from being supplied to the heater, periodically calculate the amount of the change in the inductance based on inductance output values output by the substance detector, and
- determine that the aerosol generating substance is separated from the cavity based on the amount of the change in the inductance periodically calculated.

5. The aerosol generating device of claim 4, wherein the controller is further configured to:
- supply the power to the heater based on a power supply time of a periodic control signal; and
- block the power from being supplied to the heater based on a power block time of the periodic control signal,
- wherein the power block time is shorter than the power supply time during one period of the periodic control signal.

6. The aerosol generating device of claim 5, wherein the controller is further configured to calculate the amount of the change in the inductance based on the inductance output values output by the substance detector during the power block time.

7. The aerosol generating device of claim 6, wherein the controller is further configured to determine that the aerosol generating substance is separated from the cavity based on the amount of the change in the inductance being less than or equal to a pre-set lower-limit threshold value.

8. The aerosol generating device of claim 1, wherein the controller is further configured to block the power from being supplied to the heater based on determining that the aerosol generating substance is separated from the cavity.

9. An aerosol generating system comprising:
- an aerosol generating substance; and
- an aerosol generating device that comprises:
  - a susceptor that surrounds a cavity of the aerosol generating device in which the aerosol generating substance is configured to be accommodated;
  - an induction coil configured to generate a variable magnetic field to heat the susceptor;
  - a substance detector configured to detect a change in inductance that occurs in response to insertion to the cavity and separation from the cavity of the aerosol generating substance; and
  - a controller configured to determine that the aerosol generating substance is separated from the cavity based on an amount of the change in the inductance, while power is blocked from being supplied to the induction coil.

10. The aerosol generating system of claim 9, wherein the controller is further configured to:
- activate the substance detector while the power is blocked from being supplied to the induction coil,
- calculate the amount of the change in the inductance based on an inductance output value output by the substance detector, and,
- determine that the aerosol generating substance is inserted into the cavity based on the amount of the change in the inductance being equal to or greater than a pre-set upper-limit threshold value.

11. The aerosol generating system of claim 9, wherein the controller is further configured to initiate power supply to the induction coil based on determining that the aerosol generating substance is inserted into the cavity.

12. The aerosol generating system of claim 9, wherein the controller is further configured to:
- periodically block the power from being supplied to the induction coil, based on the aerosol generating substance being inserted into the cavity,
- while the power is periodically blocked from being supplied to the induction coil, periodically calculate the amount of the change in the inductance based on inductance output values output by the substance detector, and
- determine that the aerosol generating substance is separated from the cavity based on the amount of the change in the inductance periodically calculated.

13. The aerosol generating system of claim 12, wherein the controller is further configured to:
- supply the power to the induction coil based on a power supply time of a periodic control signal; and
- block the power from being supplied to the induction coil based on a power block time of the periodic control signal,
- wherein the power block time is shorter than the power supply time during one period of the periodic control signal.

14. The aerosol generating system of claim 13, wherein the controller is further configured to calculate the amount of the change in the inductance based on the inductance output values output by the substance detector during the power block time.

15. The aerosol generating system of claim 14, wherein the controller is further configured to determine that the aerosol generating substance is separated from the cavity based on the amount of the change in the inductance being less than or equal to a pre-set lower-limit threshold value.

* * * * *